US010811916B2

(12) United States Patent
Anderson et al.

(10) Patent No.: US 10,811,916 B2
(45) Date of Patent: Oct. 20, 2020

(54) BI-METAL MOTOR HOUSING FOR HIGH HEAT TRANSFER WITH DIMENSIONAL STABILITY

(71) Applicant: LOON LLC, Mountain View, CA (US)

(72) Inventors: Kevin Anderson, Sunnyvale, CA (US); Nathan Winder, San Jose, CA (US)

(73) Assignee: Loon LLC, Mountain View, CA (US)

( * ) Notice: Subject to any disclaimer, the term of this patent is extended or adjusted under 35 U.S.C. 154(b) by 250 days.

(21) Appl. No.: 16/015,863

(22) Filed: Jun. 22, 2018

(65) Prior Publication Data

US 2019/0393744 A1 Dec. 26, 2019

(51) Int. Cl.
*H02K 1/18* (2006.01)
*H02K 5/02* (2006.01)
*H02K 5/18* (2006.01)
*H02K 5/06* (2006.01)

(52) U.S. Cl.
CPC ............... *H02K 1/185* (2013.01); *H02K 5/02* (2013.01); *H02K 5/06* (2013.01); *H02K 5/18* (2013.01); *H02K 2205/12* (2013.01)

(58) Field of Classification Search
CPC .......... H02K 1/185; H02K 7/083; H02K 5/02; H02K 5/18; H02K 5/06; H02K 5/04; H02K 5/24; H02K 5/26; H02K 5/15; H02K 5/161; H02K 5/16; H02K 2205/12
USPC ..................... 310/89, 91, 425–427
See application file for complete search history.

(56) References Cited

U.S. PATENT DOCUMENTS

| 6,946,771 | B2* | 9/2005 | Cros | H02K 1/146 310/257 |
|---|---|---|---|---|
| 7,679,255 | B2* | 3/2010 | Evans | H02K 1/148 310/216.066 |
| 2004/0113511 | A1* | 6/2004 | Schmidt | H02K 1/24 310/216.061 |
| 2010/0231064 | A1* | 9/2010 | Leachman | H02K 7/04 310/51 |
| 2014/0145548 | A1* | 5/2014 | Asao | H02K 5/06 310/216.114 |
| 2017/0033639 | A1* | 2/2017 | Harris | H02K 5/18 |
| 2019/0113034 | A1* | 4/2019 | Podack | H02K 5/15 |

* cited by examiner

*Primary Examiner* — Emily P Pham
(74) *Attorney, Agent, or Firm* — Botos Churchill IP Law

(57) ABSTRACT

A motor housing includes a core and a shell having an annular body. The annular body is configured to secure a stator of a motor therein. The annular body includes first and second ends defining first and second openings, respectively. The annular body defines a slot extending along a length of the annular body. The slot is coterminous with the first opening. The core is configured to be in registration with the shell. The core is configured to rotatably support a rotating assembly of the motor including an output shaft. The core includes a base portion, an annular ring, and a guide arm interconnecting the base portion and the annular ring. The core is in registration with the shell when the guide arm is received in the slot of the annular body of the shell to form an interlocking structure.

17 Claims, 7 Drawing Sheets

BI-METAL MOTOR HOUSING FOR HIGH HEAT TRANSFER WITH DIMENSIONAL STABILITY

BACKGROUND

Technical Field

The present disclosure relates to a motor housing and, more particularly, to a motor housing having an interlocking structure to accommodate a wide range of operating temperatures.

Background

A variety of electric motors have long been used in industrial applications, and many techniques have been developed to accommodate various operating environments. However, one of the important factors to consider in building a turbomachine is the wide range of operating temperatures. For example, in the stratosphere, the device must operate in a range of about 200 degrees Celsius. The device must start in temperatures as low as −100 degrees Celsius, but due to the high power of the device, the device may also reach temperatures as high as 100 degrees Celsius.

As the device is exposed to a wide range of extreme temperatures, the materials on the device expand or contract at a rate commensurate with their coefficient of thermal expansion. To keep the device mechanically sound and prevent damage to the bearings, the bearings must be preloaded. This is challenging because the device operates at such a tremendous speed that it must utilize a steel shaft, but with such tremendous operating power, it needs a highly thermally conductive motor housing formed of a material such as, e.g., aluminum or copper. However, aluminum, for example, has a larger coefficient of thermal expansion than that of steel. Thus, the dimensions of the output shaft and the housing change radically with respect to one another, making the preloading of the bearings very challenging.

Therefore, a continuing need exists for a motor housing that works with current motors to overcome usability challenges associated with extreme range of operating temperatures without impairing the performance requirements.

SUMMARY

The present disclosure describes a motor housing that demonstrates a practical approach to meeting the performance requirements and overcoming usability challenges associated with an extreme range of operating temperatures. In accordance with an embodiment of the present disclosure, a motor housing includes a shell and a core. The shell includes an annular body defining a chamber therein. The annular body is configured to secure a stator of a motor therein. The annular body includes first and second ends defining first and second openings, respectively. In particular, the annular body defines a slot extending along a length of the annular body. The slot is coterminous with the first opening. The core is configured to be in registration with the shell. In particular, the core is dimensioned to be received in the chamber of the shell. The core is configured to rotatably support a rotating assembly of the motor including an output shaft. The core includes a base portion, an annular ring, and a guide arm interconnecting the base portion and the annular ring. The core is in registration with the shell when the guide arm is received in the slot of the annular body of the shell to form an interlocking structure.

In an embodiment, the shell may be formed of a first material, and the core may be formed of a second material different from the first material.

In another embodiment, the shell may be formed of a thermally conductive material.

In an embodiment, the shell may be formed of aluminum.

In another embodiment, the core may be formed of steel.

In yet another embodiment, at least one of the shell or the core may be monolithically formed.

In yet another embodiment, the guide arm of the core may be connected to a peripheral portion of the base portion of the core such that at least a portion of the guide arm connected to the base portion is disposed radially outward of the base portion.

In still yet another embodiment, the annular body of the shell may include an outer surface having a fin extending radially outward.

In still yet another embodiment, the fin may extend along at least a length of the annular body of the shell.

In still yet another embodiment, a portion of the fin may engage the annular ring of the core when the core is in registration with the shell.

In an embodiment, the second end of the annular body of the shell may include a ledge, whereby when the core is in registration with the shell, the guide arm of the core engages the ledge of the shell such that the base portion of the core is flush with the second end of the shell.

In another embodiment, the base portion of the core may define an aperture configured to receive the output shaft of the motor therethrough.

In yet another embodiment, the base portion may include an annular flange concentrically disposed with the aperture. The annular flange may be configured to secure the bearing assembly of the motor thereto.

In still another embodiment, the annular ring of the core may define a bore dimensioned to receive a fastener configured to secure a cover plate of the motor thereto.

In still yet another embodiment, the guide arm of the core may include an outer surface having a curvature identical to a curvature of an outer surface of the shell.

In accordance with another embodiment of the present disclosure, a motor housing includes a shell and a core. The shell defines a chamber therein. The shell is configured to secure a stator of a motor therein. The shell is formed of a first material. The shell includes a first structure. The core is configured to be received in the chamber of the shell. The core is configured to rotatably support a rotating assembly of the motor including an output shaft. The core is formed of a second material different from the first material. The core includes a second structure configured to interlock with the first structure of the shell.

In an embodiment, at least one of the shell or the core may be integrally formed as a single construct.

In another embodiment, the core and the shell may be coupled through explosion bonding or brazing.

DESCRIPTION OF THE DRAWINGS

The foregoing objects, features and advantages of the disclosure will become more apparent from a reading of the following description in connection with the accompanying drawings, in which.

DETAILED DESCRIPTION

Figure 1:
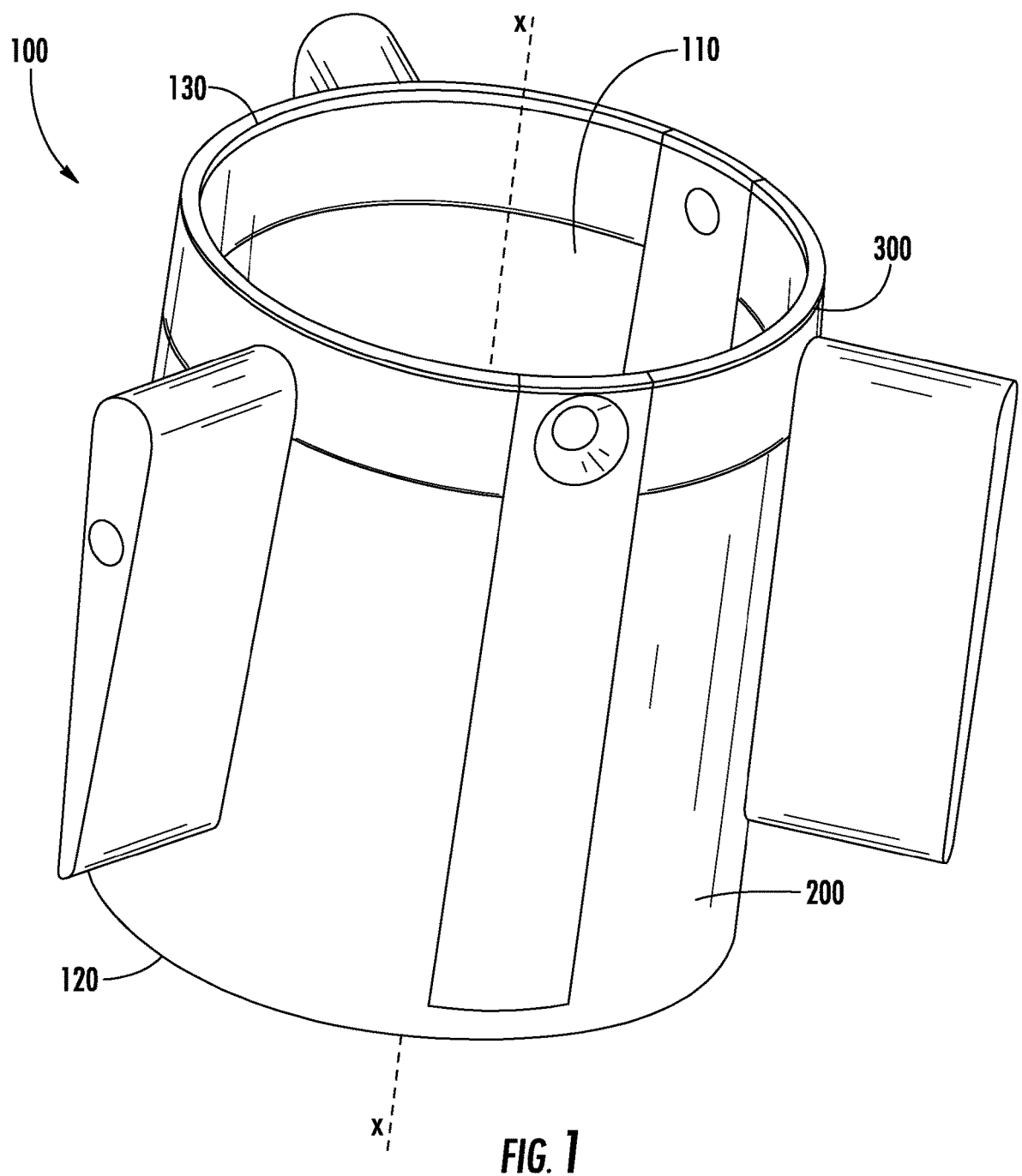
FIG. 1 is a perspective view of a motor housing in accordance with an embodiment of the present disclosure.

Embodiments of the present bi-metal motor housing will now be described in detail with reference to the drawings, in which like reference numerals designate identical or corresponding elements in each of the several views. In the following description, well-known functions or constructions are not described in detail to avoid obscuring the present disclosure in unnecessary detail.

Figure 2:
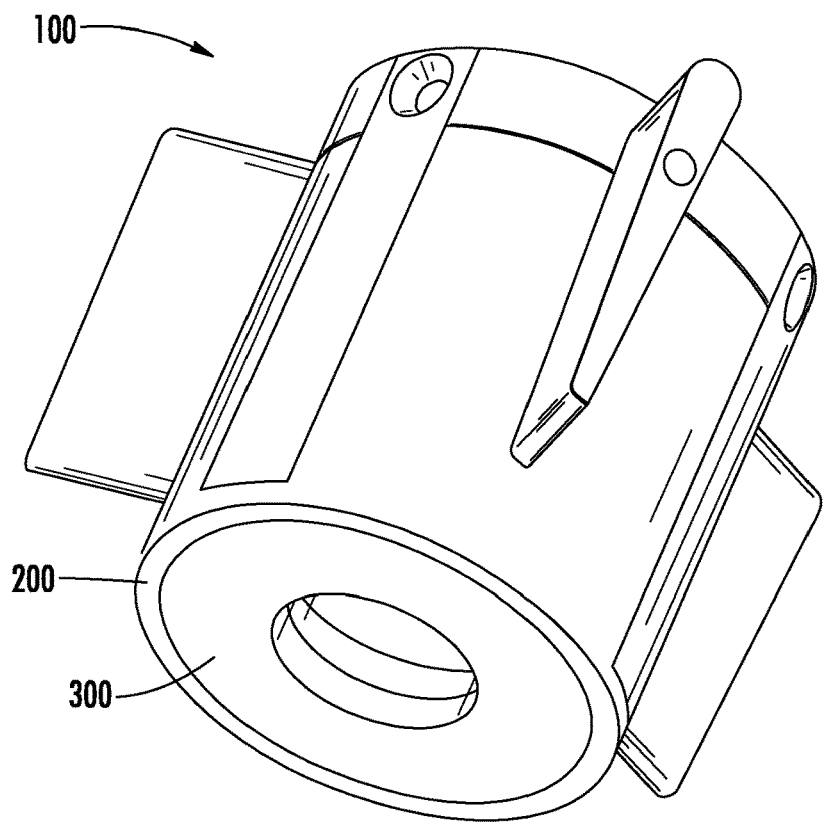
FIG. 2 is a bottom perspective view of the motor housing of FIG. 1.

With reference to FIGS. 1 and 2, an embodiment of the present disclosure is generally shown as a motor housing 100. The motor housing 100 is adapted to be particularly useful in extreme operating temperatures. However, the motor housing 100 may be used with electric motors of any suitable motor technology. The motor housing 100 provides an interlocking structure, in which, a stator winding assembly is secured to a first component formed of a material having high thermal conductivity, and a bearing assembly and an output shaft are mounted to a second component interlocked with the first component and formed of a material providing structural integrity at, e.g., extreme temperatures, as will be discussed hereinbelow. The bearing assembly rotatably supports an output shaft of the motor. The motor housing 100 has a substantially cylindrical or annular configuration defining a chamber 110, in which, various components of an electric motor (not shown) may be housed. Basic components of a motor will not be described herein, as the internal construction of motors is well known in the art. The motor housing 100 may be constructed of any suitable heat-conducting material having sufficient structural strength. In particular, the motor housing 100 includes a shell 200 formed of a material suitable to facilitate heat transfer and a core 300 formed of a material suitable to provide structural integrity to the motor housing 100. The core 300 is concentrically nested within the shell 200. The motor housing 100 defines a longitudinal axis "X-X" (FIG. 1) between first and second ends 120, 130.

Figure 3:
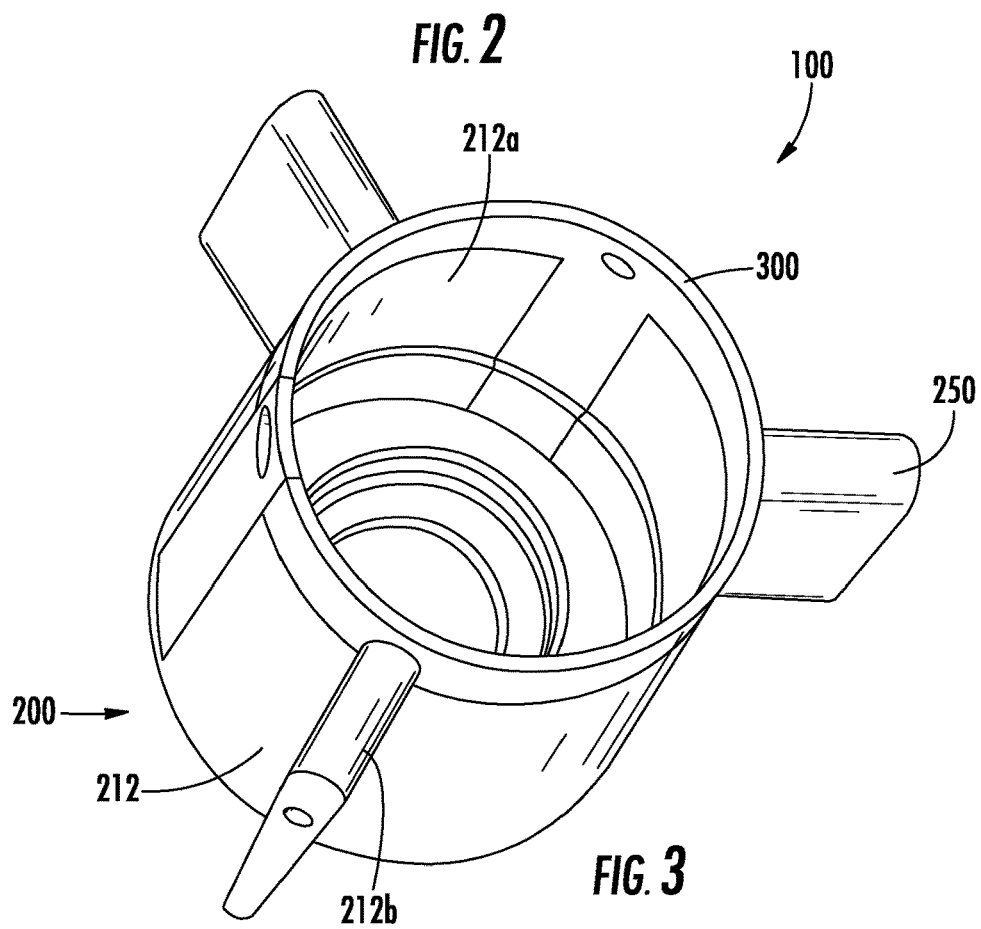
FIG. 3 is a top perspective view of the motor housing of FIG. 1.
Figure 4:
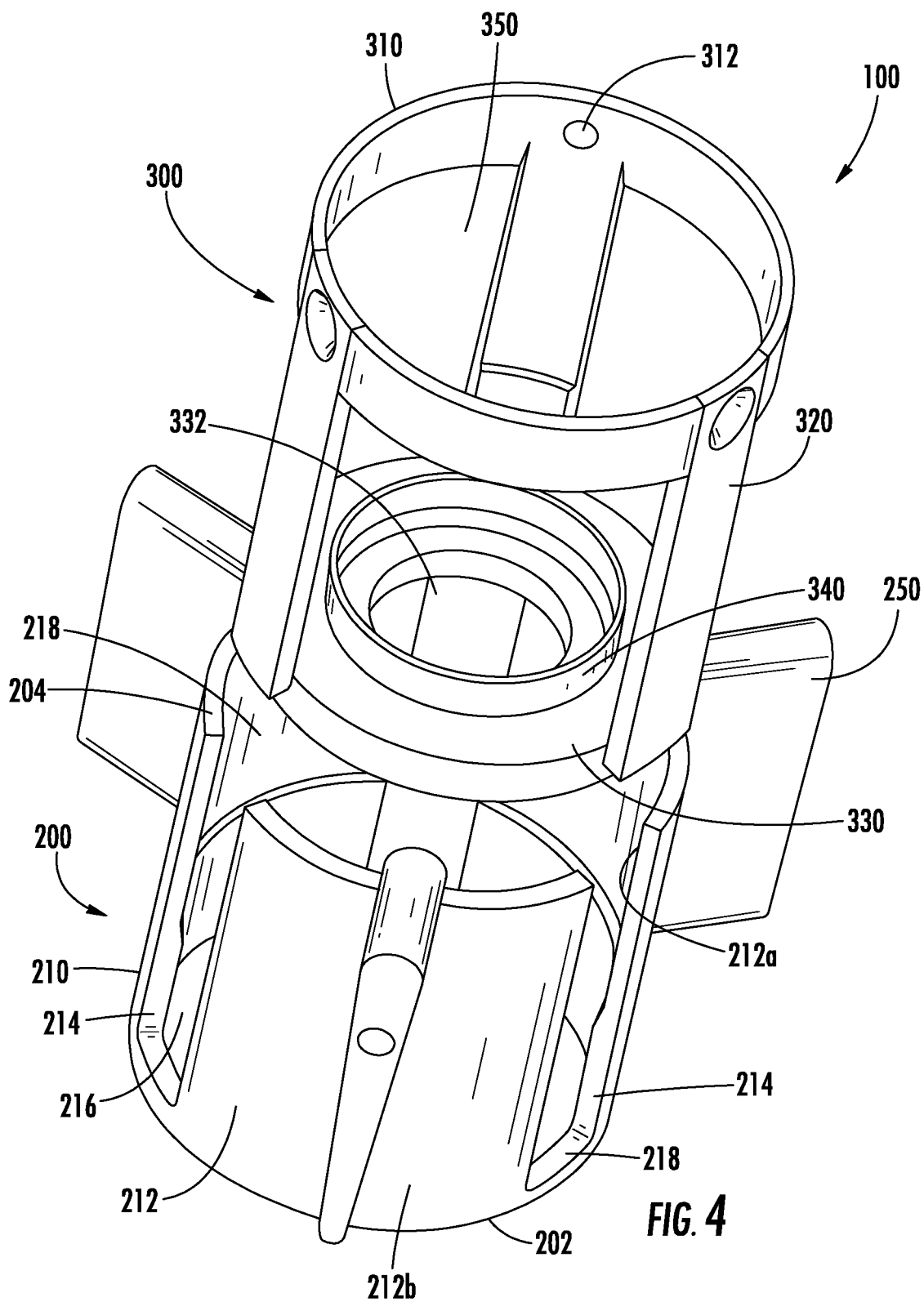
FIG. 4 is an exploded perspective view of the motor housing of FIG. 1 with parts separated.

With reference now to FIGS. 3 and 4, the shell 200 includes a body 210 having a substantially cylindrical configuration. The body 210 includes an annular wall 212 including first and second ends 202, 204 defining first and second openings 216, 218, respectively. The body 210 defines slots 214 circumferentially arranged thereabout. Each slot 214 is coterminous with the second opening 218. In particular, each slot 214 extends along a length of the body 210 from the second opening 218 towards a ledge 218 disposed in the first end 202 of the body 210. The annular wall 212 of the body 210 includes an inner surface 212a and an outer surface 212b. A generally cylindrical stator winding assembly (not shown) of the motor is mechanically affixed to the inner surface 212a of the annular wall 212 by using, e.g., a compression fit or interference fit. For example, an inner diameter of the annular wall 212 may be smaller than an outer diameter of the stator winding assembly, thereby providing high thermal conductivity between the inner surface 212a of the annular wall 212 and the stator winding assembly. The interference fit may be achieved by temporarily enlarging the inner diameter of the shell 200 by thermal expansion, positioning the stator winding assembly as desired, and allowing the annular wall 212 to contract around the stator winding assembly. Heating produces sufficient thermal expansion that the inner diameter of the shell 200 temporarily becomes larger than the outer diameter of the stator winding assembly. As the housing 200 cools, it contracts around the stator winding assembly, producing a secure compression/shrink fit engagement between the inner wall 212a of the annular wall 212 and the stator winding assembly. This process eliminates essentially all air gaps and other voids between the inner wall 212a and the stator winding assembly. As a result, the interface between the stator winding assembly and the housing inner wall provides high thermal conductivity, allowing substantially all of the heat generated by the stator winding assembly to be conductively transferred from the stator winding assembly to the annular wall 212, and then dissipated out of the shell 200. However, other methods of securing the stator winding assembly could also be used.

Typically, the stator winding assembly produces undesired heat energy due to eddy currents and other electrical losses. To this end, the shell 200 is formed of a material having high thermal conductivity, such as, e.g., aluminum, which conducts the waste heat from the stator winding assembly and heat generated by the bearing assembly out of the motor housing 100 to inhibit burnout. The shell 200 may be cast from an appropriate alloy of aluminum. For example, commercially available Type 319, Type 356, and Type 380 aluminum alloys may be used.

The outer surface 212b of the annular wall 212 may further include a plurality of fins 250 to further dissipate heat from the body 210. Each fin 250 extends along a length of the annular wall 212. In particular, each fin 250 extends beyond the second end 204 (FIG. 4) of the shell 200 such that a portion of each fin 250 engages the core 300, whereby the core 300 is disposed radially inward of the fins 250 when the core 300 is in registration with the shell 200.

With particular reference now to FIG. 4, the core 300 includes a chamber 350 dimensioned to receive a rotor (not shown) and a motor output shaft (not shown) extending therethrough. The core 300 further includes an annular ring 310, a base portion 330 defining a concentrically arranged aperture 332, and a plurality of guide arms 320. The plurality of guide arms 320 is circumferentially arranged about the annular ring 310. The plurality of guide arms 320 interconnects the base portion 330 and the annular ring 310. In particular, the plurality of guide arms 320 is connected to an outer peripheral portion of the base portion 330 such that the base portion 330 is disposed radially inward of the guide arms 320. Each guide arm 320 is dimensioned to be received in the slot 214 defined in the annular wall 212 of the shell 200. In particular, each guide arm 320 may include a curvature identical to a curvature of the body 210 of the shell 200. In addition, the base portion 330 includes an annular flange 340 configured to securely mount a bearing assembly (not shown) rotationally supporting a motor output shaft (not shown). Under such a configuration, when the core 300 is in registration with the shell 200 such that the guide arms 320 are received in the respective slots 214 defined in the shell 200, the guide arms 320 engage the ledge 218 of the shell 200 and the base portion 330 is disposed radially inward of the ledge 218. A thickness of the ledge 218 and a thickness of the base portion 330 may be identical such that when the core 300 is in registration with the shell 200 the base portion 330 is flush with the first end 202 of the shell 200 (FIG. 2).

The core 300 may be monolithically formed. In particular, the core 300 may be formed of a material suitable for providing structural integrity to the motor housing 100. For example, the core 300 may be formed of the same material as the motor output shaft. For example, the core 300 may be formed of steel. The highly-thermally conductive shell 200 formed of aluminum has larger coefficient of thermal expansion than the coefficient of thermal expansion of the core 300 formed of steel. However, under such a configuration, the structural path of the motor housing 100 is isolated from the thermal path. In particular, the interlocking configuration of the motor housing 100 enables the core 300 to support the bearing assembly and the motor output shaft, while the shell 200 conducts the waste heat from the stator winding assembly and heat generated by the bearing assembly, out of the motor housing 100. The shell 200 and the core 300 may be coupled to each other through, e.g., explosion bonding, brazing, electroplating, thin film application of aluminum/copper onto steel/titanium, chemical vapor deposition (CVD), or physical vapor deposition (PVD), in order to eliminate, e.g., slip, stiction, or variability.

The motor housing 100 may be further provided with a cover plate (not shown) at the second end 130 to retain the internal components of the motor and to provide a closure to inhibit gross infiltration of foreign objects into the chamber 110 of the motor housing 100. To this end, the annular ring 310 may define bores 312 to receive fasteners to secure the cover plate with the annular ring 310. The cover plate may further include a second bearing assembly to rotatably support a second end of the motor output shaft (not shown).

Under such a configuration, the motor housing 100 is able to accommodate a wide range of operating temperatures. The stator winding assembly of the motor is fixedly secured with the highly conductive shell 200, and the bearing assembly and the motor output shaft are securely mounted to the core 300 having structural integrity to withstand the mechanical output of the motor output shaft in extreme operating temperatures. In this manner, the issues that arise as a result of wide range of operating temperatures, such as, e.g., bearing preload failure, are eliminated.

Figure 5:
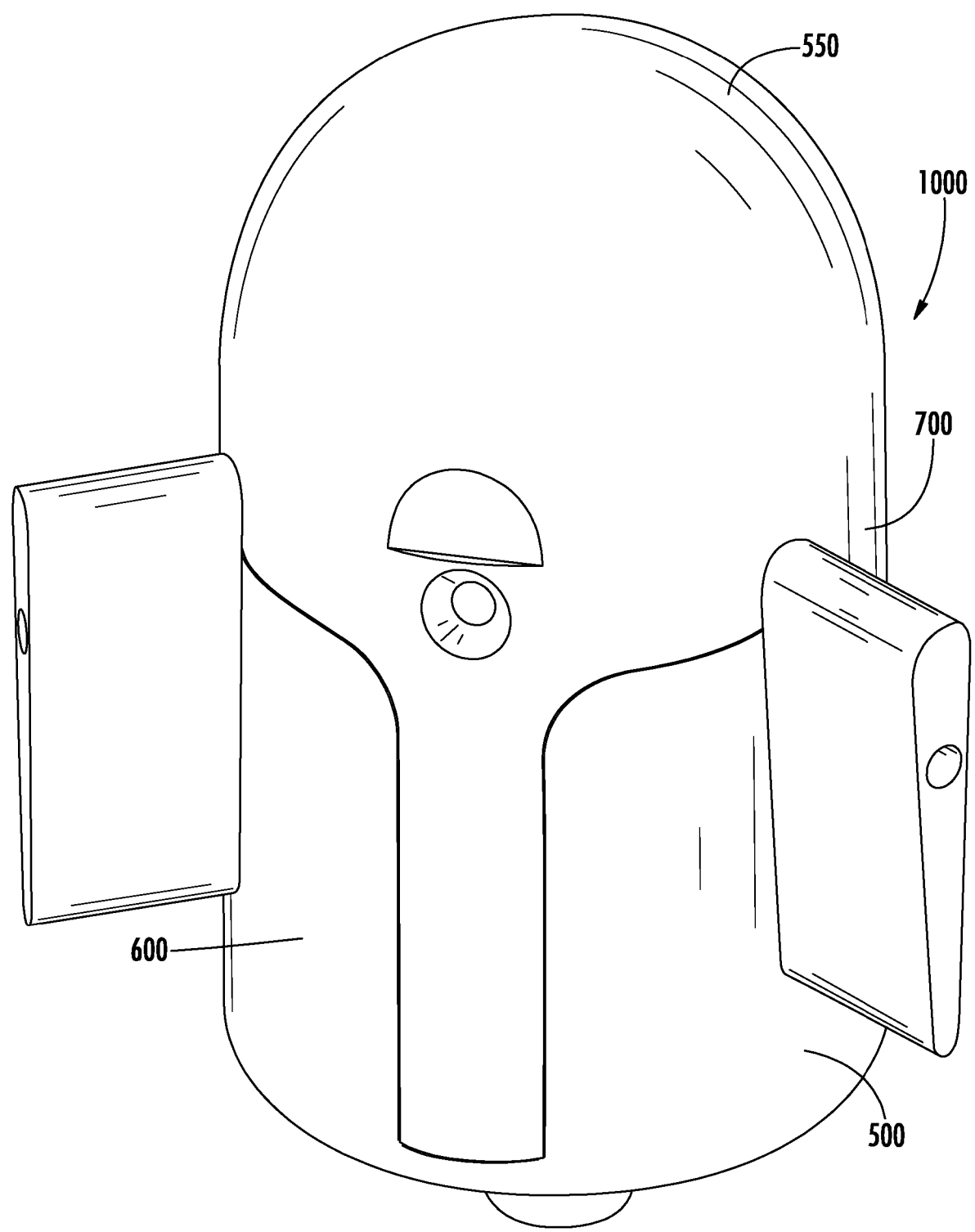
FIG. 5 is a perspective view of a motor assembly including a motor housing in accordance with another embodiment of the present disclosure.
Figure 6:
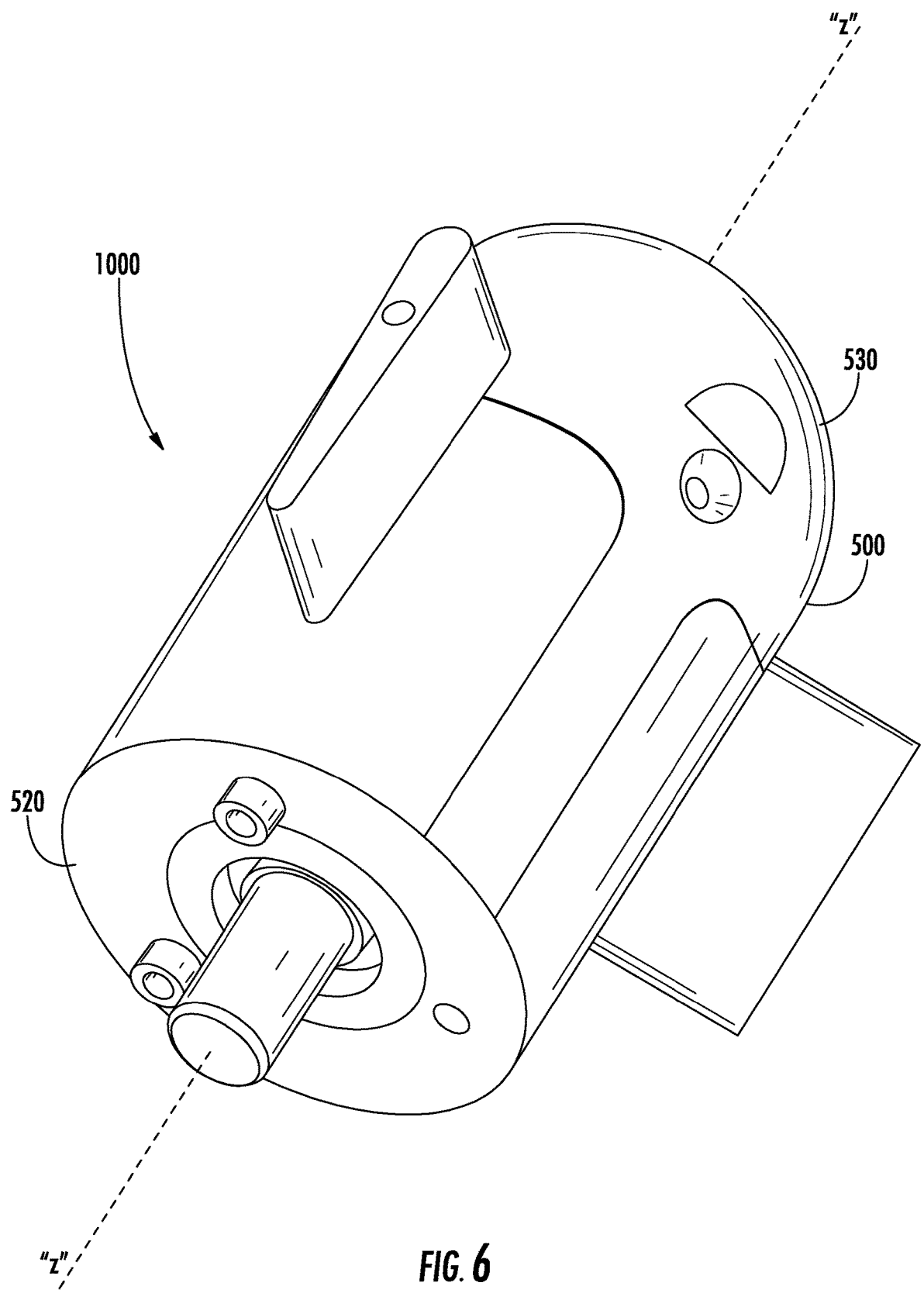
FIG. 6, is a bottom perspective view of the motor assembly of FIG. 5.
Figure 7:
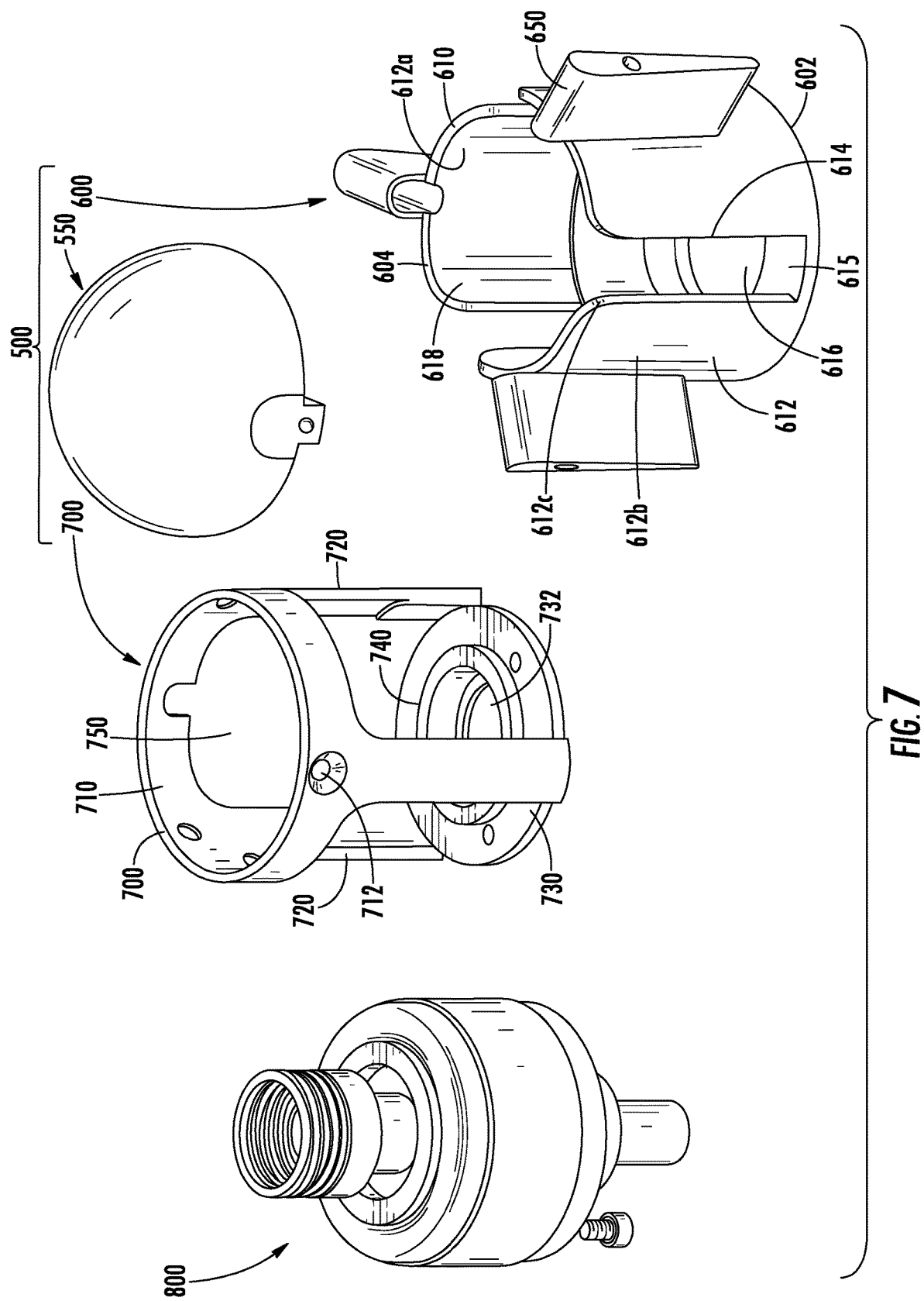
FIG. 7 is perspective view of the motor assembly of FIG. 5 illustrating the motor housing separated.

With reference to FIGS. 5-7, there is illustrated a motor assembly 1000 including a motor housing 500 in accordance with another embodiment of the present disclosure. Parts of the motor assembly 1000 identical to the motor housing 100 will not be described in detail to avoid obscuring the present disclosure in unnecessary detail. The motor housing 500 is adapted to be particularly useful in extreme operating temperatures. The motor housing 500 provides an interlocking structure, in which, a stator winding assembly 810 (FIG. 8) is secured to a first component formed of a material having high thermal conductivity, and a bearing assembly 820 and a rotating assembly 830 (FIG. 8) including an output shaft 832 are mounted to a second component interlocked with the first component and formed of a material providing structural integrity at, e.g., extreme temperatures, as will be discussed hereinbelow. The bearing assembly 820 rotatably supports the output shaft 832. The motor housing 500 has a substantially cylindrical or annular configuration defining a chamber, in which, various components of an electric motor 800 (FIG. 8) may be housed. Basic components of the motor 800 will not be described herein, as the internal construction of motors is well known in the art. The motor housing 500 may be constructed of any suitable heat-conducting material having sufficient structural strength. In particular, the motor housing 500 includes a shell 600 formed of a material suitable to facilitate heat transfer, a core 700 formed of a material suitable to provide structural integrity to the motor housing 500, and an end cap 550. The core 700 is concentrically nested within the shell 600. The motor housing 500 defines a longitudinal axis "Z-Z" (see FIG. 6) between first and second ends 520, 530.

Figure 8:
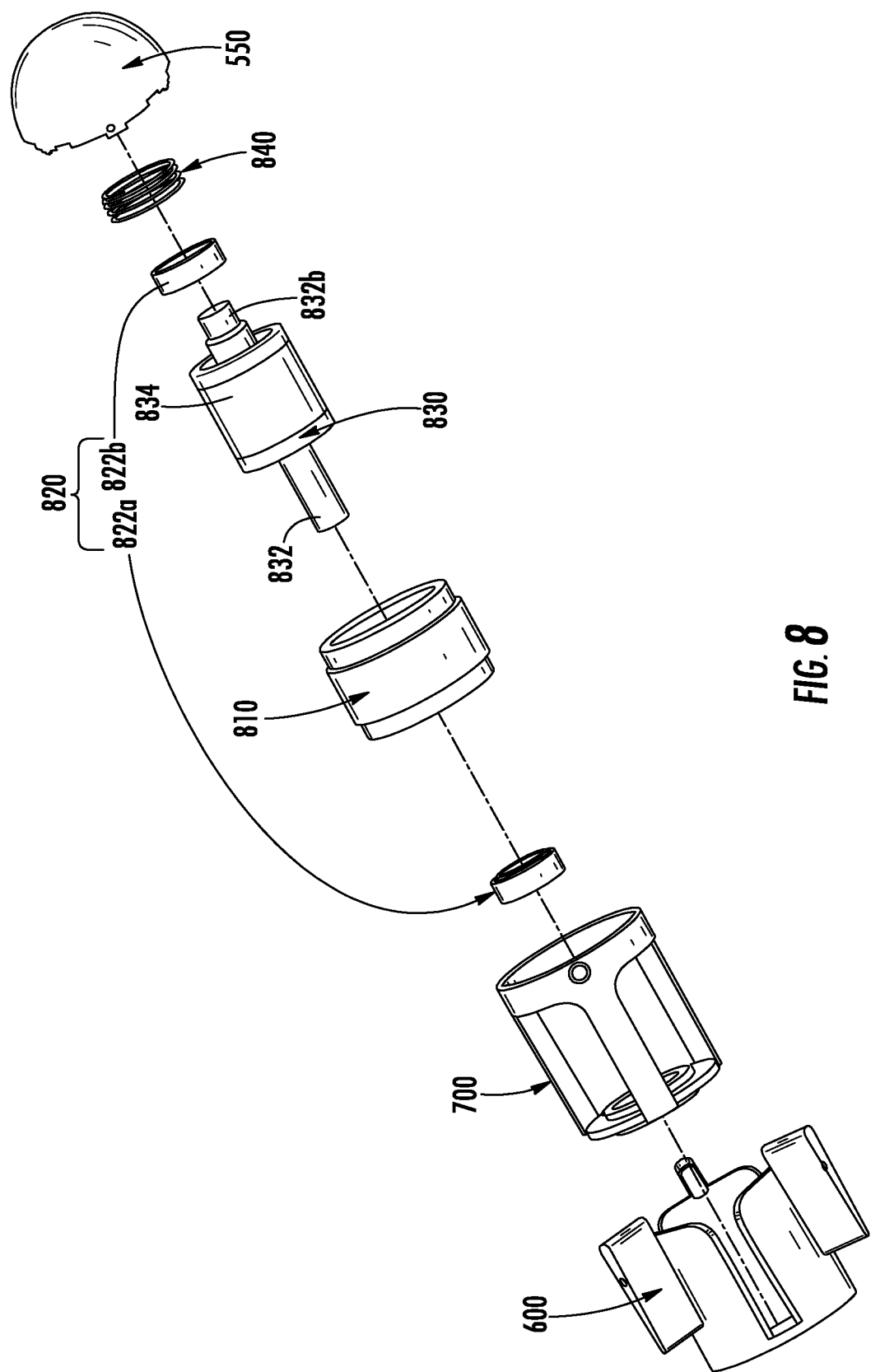
FIG. 8 is an exploded perspective view of the motor assembly of FIG. 5 with parts separated.

With reference now to FIGS. 7 and 8, the shell 600 includes a body 610 having a substantially cylindrical configuration. The body 610 includes an annular wall 612 including first and second ends 602, 604 defining first and second openings 616, 618, respectively. In particular, the first end 602 includes an annular lip 615 extending radially inward. The body 610 defines slots 614 circumferentially arranged thereabout. Each slot 614 is coterminous with the second opening 618. In particular, each slot 614 extends along a length of the body 610 from the second opening 618 towards the annular lip 615 disposed in the first end 602 of the body 610. A portion of the annular wall 612 adjacent the second end 604 may include an arcuate portion 612c.

The annular wall 612 of the body 610 includes an inner surface 612a and an outer surface 612b. A generally cylindrical stator winding assembly 810 of the motor 800 is mechanically affixed to the inner surface 612a of the annular wall 612 by using, e.g., a compression fit or interference fit. For example, an inner diameter of the annular wall 612 may be smaller than an outer diameter of the stator winding assembly, thereby providing high thermal conductivity between the inner surface 612a of the annular wall 612 and the stator winding assembly. The interference fit may be achieved by temporarily enlarging the inner diameter of the shell 600 by thermal expansion, positioning the stator winding assembly 810 as desired, and allowing the annular wall 612 to contract around the stator winding assembly 810. Heating produces sufficient thermal expansion that the inner diameter of the shell 600 temporarily becomes larger than the outer diameter of the stator winding assembly 810. As the housing 600 cools, it contracts around the stator winding assembly, producing a secure compression/shrink fit engagement between the inner wall 612a of the annular wall 612 and the stator winding assembly. This process eliminates essentially all air gaps and other voids between the inner wall 612a and the stator winding assembly 810. As a result, the interface between the stator winding assembly 810 and the inner wall 612a provides high thermal conductivity, allowing substantially all of the heat generated by the stator winding assembly 810 to be conductively transferred from the stator winding assembly 810 to the annular wall 612, and then dissipated out of the shell 600. However, other methods of securing the stator winding assembly could also be used.

Typically, the stator winding assembly 810 produces undesired heat energy due to eddy currents and other electrical losses. To this end, the shell 600 is formed of a material having high thermal conductivity, such as, e.g., aluminum, which conducts the waste heat from the stator winding assembly 810 and heat generated by the bearing assembly 820 out of the motor housing 500 to inhibit burnout. The shell 600 may be cast from an appropriate alloy of aluminum. For example, commercially available Type 319, Type 356, and Type 380 aluminum alloys may be used.

The outer surface 612b of the annular wall 612 may further include a plurality of fins 650 to further dissipate heat from the body 610 and to add to the structural integrity of the motor housing 500. Each fin 650 extends along a length of the annular wall 612. In particular, each fin 650 extends beyond the second end 604 of the shell 600 such that a portion of each fin 650 engages the core 700, whereby the core 700 is disposed radially inward of the fins 650 when the core 700 is in registration with the shell 600.

With continued reference to FIGS. 7 and 8, the core 700 includes a chamber 750 dimensioned to receive a rotating assembly 830 including a rotor 834 and a motor output shaft 832. The core 700 further includes an annular ring 710, a base portion 730 defining a concentrically arranged aperture 732, and a plurality of guide arms 720. The plurality of guide arms 720 is circumferentially arranged about the annular ring 710. The plurality of guide arms 720 interconnects the base portion 730 and the annular ring 710. In particular, the plurality of guide arms 720 is connected to an outer peripheral portion of the base portion 730 such that the base portion 730 is disposed radially inward of the guide arms 720. The guide arms 720 and the annular ring 710 include arcuate portions 713 configured to engage the arcuate portions 612c of the shell 600. Each guide arm 720 is dimensioned to be received in the slot 614 defined in the annular wall 612 of the shell 600. In particular, each guide arm 720 may include a curvature identical to a curvature of the body 610 of the shell 600. In addition, the base portion 730 includes an annular flange 740 configured to securely mount a first bearing 822a of the bearing assembly 820 rotationally supporting the motor output shaft 832. Under such a configuration, when the core 700 is in registration with the shell 600 such that the guide arms 720 are received in the respective slots 614 defined in the shell 600, the base portion 730 of the core 700 engages the annular lip 615 of the shell 600 in a superposed relation.

The core 700 may be monolithically formed. In particular, the core 700 may be formed of a material suitable for providing structural integrity to the motor housing 500. For example, the core 700 may be formed of the same material as the motor output shaft 832. For example, the core 700 may be formed of steel. The highly-thermally conductive shell 600 formed of aluminum has larger coefficient of thermal expansion than the coefficient of thermal expansion of the core 700 formed of steel. However, under such a configuration, the structural path of the motor housing 500 is isolated from the thermal path. In particular, the interlocking configuration of the motor housing 500 enables the core 700 to support the bearing assembly 820 and the motor output shaft 832, while the shell 600 conducts the waste heat from the stator winding assembly 810 and heat generated by the bearing assembly 820, out of the motor housing 500. The shell 600 and the core 700 may be coupled to each other through, e.g., explosion bonding, brazing, electroplating, thin film application of aluminum/copper onto steel/titanium, chemical vapor deposition (CVD), or physical vapor deposition (PVD), in order to eliminate, e.g., slip, stiction, or variability.

With particular reference to FIG. 8, the motor housing 500 may be further provided with an end cap 550 at the second end 530 (FIG. 6) to retain the internal components of the motor 800 and to provide a closure to inhibit gross infiltration of foreign objects into the chamber of the motor housing 500. In particular, a second end portion 832b of the motor output shaft 832 is supported by a second bearing 822b of the bearing assembly 820. The second bearing 822b is operatively coupled with the end cap 550 and is biased by a biasing member 840. Furthermore, the annular ring 710 (FIG. 7) of the core 700 may define bores 712 to receive fasteners (not shown) to secure the end cap 550 with the core 700.

Under such a configuration, the motor housing 500 is able to accommodate a wide range of operating temperatures. The stator winding assembly 810 of the motor 800 is fixedly secured with the highly conductive shell 600, and the bearing assembly 820 and the rotating assembly 830 including the motor output shaft 832 are securely mounted to the core 700 having structural integrity to withstand the mechanical output of the motor output shaft 832 in extreme operating temperatures. In this manner, the issues that arise as a result of wide range of operating temperatures, such as, e.g., bearing preload failure, are eliminated.

Persons skilled in the art will understand that the structures and methods specifically described herein and shown in the accompanying figures are non-limiting exemplary embodiments, and that the description, disclosure, and figures should be construed merely as exemplary of particular embodiments. For example, while the shell 200, 600 and the core 300, 700 are described as being formed of aluminum and steel, respectively, it is contemplated that other materials, such as, e.g., bronze and titanium, may be used. It is to be understood, therefore, that the present disclosure is not limited to the precise embodiments described, and that various other changes and modifications may be effected by one skilled in the art without departing from the scope or spirit of the disclosure.

Additionally, the elements and features shown or described in connection with certain embodiments may be combined with the elements and features of certain other embodiments without departing from the scope of the present disclosure, and that such modifications and variations are also included within the scope of the present disclosure. Accordingly, the subject matter of the present disclosure is not limited by what has been particularly shown and described.

What is claimed is:

1. A motor housing comprising:
   a shell including an annular body defining a chamber therein, the annular body configured to secure a stator of a motor therein, the annular body including first and second ends defining first and second openings, respectively, the annular body defining a slot extending along a length of the annular body, the slot being coterminous with the first opening; and
   a core configured to be in registration with the shell, the core dimensioned to be received in the chamber of the shell, the core configured to rotatably support a rotating assembly of the motor including an output shaft, the core including a base portion, an annular ring, and a guide arm interconnecting the base portion and the annular ring, wherein the core is in registration with the shell when the guide arm is received in the slot of the annular body of the shell to form an interlocking structure.

2. The motor housing according to claim 1, wherein the shell is formed of a first material, and the core is formed of a second material different from the first material.

3. The motor housing according to claim 2, wherein the shell is formed of a thermally conductive material.

4. The motor housing according to claim 3, wherein the shell is formed of aluminum.

5. The motor housing according to claim 1, wherein the guide arm of the core is connected to a peripheral portion of the base portion of the core such that at least a portion of the guide arm connected to the base portion is disposed radially outward of the base portion.

6. The motor housing according to claim 1, wherein the core is formed of steel.

7. The motor housing according to claim 1, wherein at least one of the shell or the core is monolithically formed.

8. The motor housing according to claim 1, wherein the annular body of the shell includes an outer surface having a fin extending radially outward.

9. The motor housing according to claim 8, wherein the fin extends along at least a length of the annular body of the shell.

10. The motor housing according to claim 9, wherein a portion of the fin engages the annular ring of the core when the core is in registration with the shell.

11. The motor housing according to claim 1, wherein the second end of the annular body of the shell includes a ledge, whereby when the core is in registration with the shell, the guide arm of the core engages the ledge of the shell such that the base portion of the core is flush with the second end of the shell.

12. The motor housing according to claim 1, wherein the base portion of the core defines an aperture configured to receive the rotating assembly.

13. The motor housing according to claim 12, wherein the base portion includes an annular flange concentrically disposed with the aperture, the annular flange configured to secure a bearing assembly of the motor thereto.

14. The motor housing according to claim 1, wherein the annular ring of the core defines a bore dimensioned to receive a fastener configured to secure a cover plate of the motor thereto.

15. The motor housing according to claim 1, wherein the guide arm of the core includes an outer surface having a curvature identical to a curvature of an outer surface of the shell.

16. The motor housing according to claim 1, wherein the core and the shell are coupled through explosion bonding or brazing.

17. The motor housing according to claim 4, wherein the core is formed of steel.

* * * * *